2 Sheets—Sheet 1.
F. E. McNALL.
Grain-Binder.
No. 199,219. Patented Jan. 15, 1878.
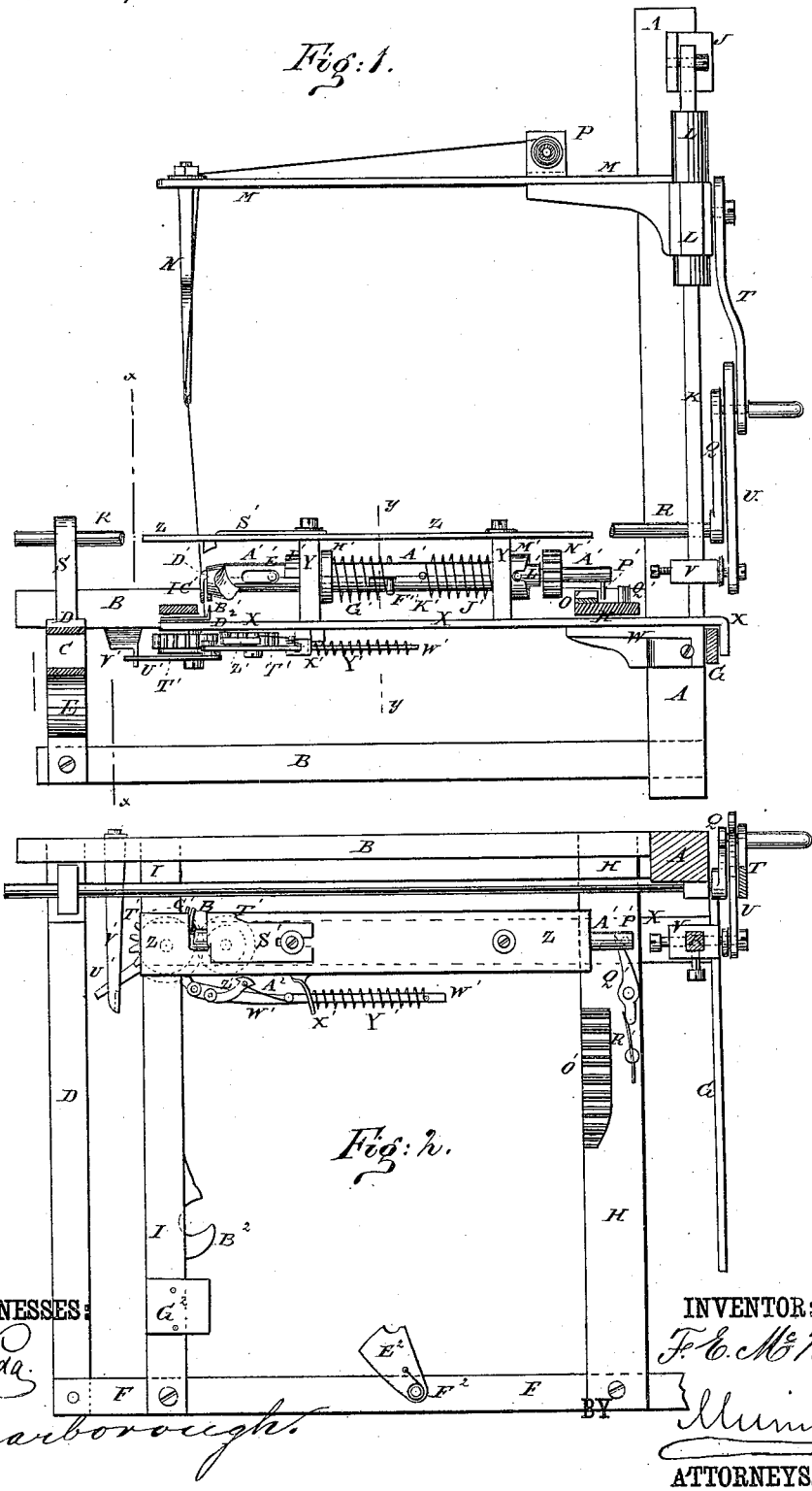
WITNESSES:
Chas Nida
J. H. Scarborough
INVENTOR:
F. E. McNall
BY Munn & Co
ATTORNEYS.
N. PETERS, PHOTO-LITHOGRAPHER, WASHINGTON, D. C.

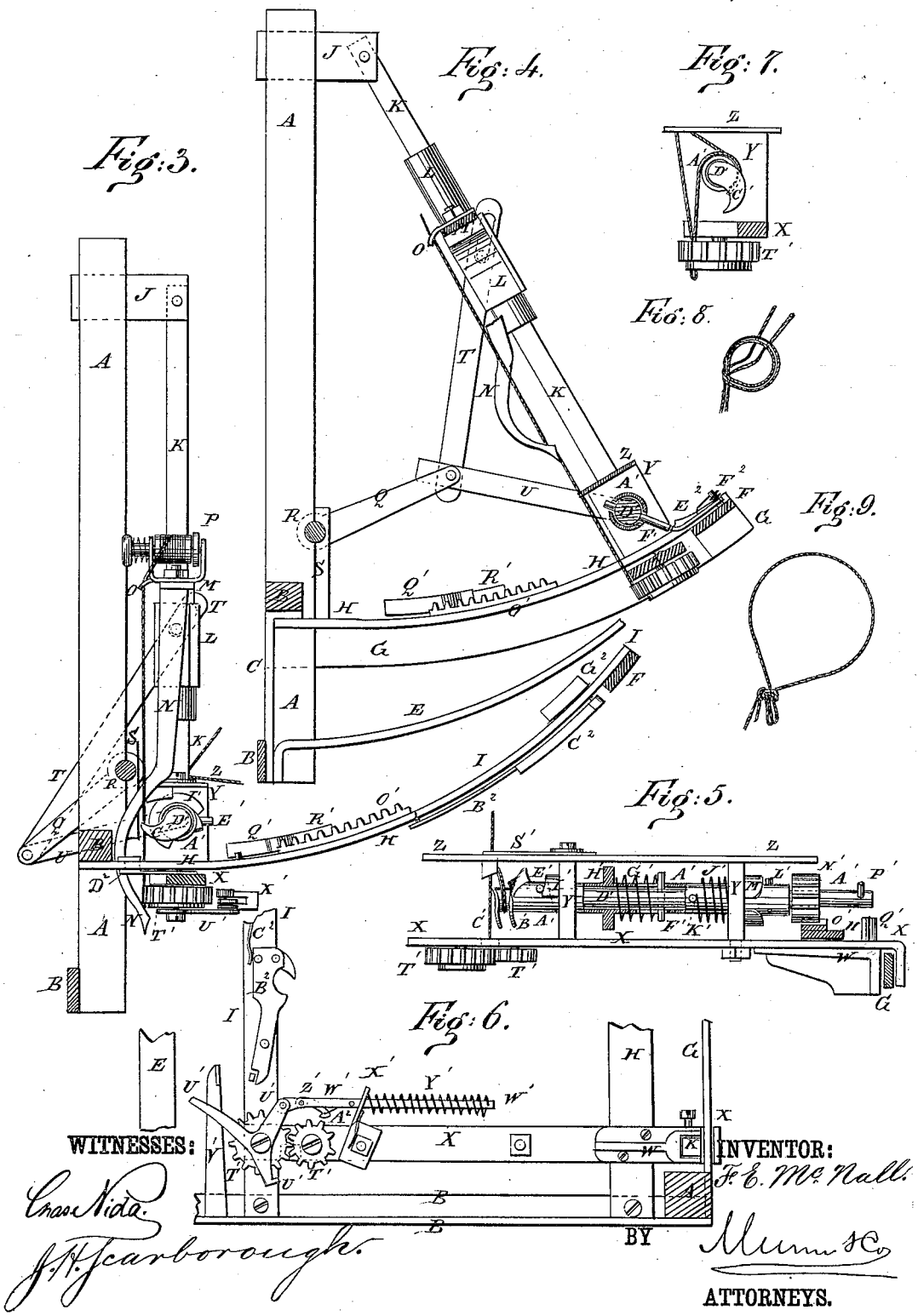

UNITED STATES PATENT OFFICE.

FRANK E. McNALL, OF WEST HENRIETTA, NEW YORK.

IMPROVEMENT IN GRAIN-BINDERS.

Specification forming part of Letters Patent No. 199,219, dated January 15, 1878; application filed October 8, 1877.

*To all whom it may concern:*

Be it known that I, FRANK E. McNALL, of West Henrietta, in the county of Monroe and State of New York, have invented a new and useful Improvement in Grain-Binders, of which the following is a specification:

Figure 1, Sheet 1, is a front view of my improved binder, parts being broken away to show the construction. Fig. 2, Sheet 1, is a top view of the same, parts being broken away to show the construction. Fig. 3, Sheet 2, is a side view, partly in section, through the line $x\ x$, Fig. 1. Fig. 4, Sheet 2, is a side view, partly in section, through the line $y\ y$, Fig. 1. Fig. 5, Sheet 2, is a detail front view of the device for tying the knot. Fig. 6, Sheet 2, is a detail bottom view of the same. Fig. 7, Sheet 2, is a detail end view of the device shown in Fig. 5. Fig. 8, Sheet 2, is a detail view of the knot. Fig. 9 is a detail view of the complete band.

Similar letters of reference indicate corresponding parts.

The object of this invention is to furnish an improved device for attachment to a harvester to bind the grain with twine, forming a hard knot, not liable to slip, and which shall be simple in construction and reliable in operation.

The invention consists in the tube and the rod provided with the jaws, the pins, and the springs, in combination with the bar, the swinging bar, and the curved frame; in the combination of the gear-wheel, the toothed rack, and the spring-guide with the tube and rod and their attachments; in the combination of the spring-knife and the rubber block with the curved bar of the frame-work, and with the tube and rod and their attachments; and in the combination of the sliding bracket, the arm, and the needle with the swinging bar and the tube and rod and their attachments, as hereinafter fully described.

A is an upright post attached to the frame-work of the harvester. To the lower part of the post A are attached the inner ends of two bars, B, which are placed the one above the other, and the outer ends of which are connected by a bar, C.

To the outer end of the upper bar B is attached the end of a curved bar, D, which is strengthened by the brace-bar E. The outer end of the brace-bar E is attached to the end of the curved bar D, to which end is also attached the end of a bar, F, placed parallel with the bars B. The other end of the bar F is attached to the outer end of the curved bar G, the other end of which is attached to the post A.

To the upper bar B, at a little distance from its inner and outer ends, are attached the ends of two curved bars, H I, the other ends of which are attached to the bar F.

To the upper end of the post A is attached a bearing, J, to which is pivoted the upper end of a swinging bar, K.

L is a bracket, which slides up and down upon the swinging bar K, and to which is attached a bar, M, which projects parallel with the bars B, and to the outer end of which is attached the upper end of the needle N. The lower part of the needle is curved, and in its lower end is formed an eye to receive the twine, which passes through a guide-eye, O, attached to the outer end of the bar M, and is wound upon a reel, P, attached to the upper side of the inner part of the said bar M.

Q is a crank, the shaft R of which revolves in bearings S attached to the post A and bar D, and to which, or to its shaft, the driving-power is applied. T is a connecting-rod, the lower end of which is pivoted to the crank Q, and its upper end is pivoted to the bracket L that carries the needle-bar M, so that the needle N may be raised and lowered by the revolution of the crank Q. To the crank Q is also pivoted the end of a connecting-rod, U, the other end of which is pivoted to a collar, V, secured in place upon the swinging bar K by a set-screw, so that the said bar K may be oscillated by the revolution of the crank Q.

To the lower end of the swinging bar K is secured, by a set-screw, a bracket, W, the outer end of which moves along the inner side of the curved bar G, and to which is attached a bar, X. The bar X moves along the upper edge of the curved bar G and the lower sides of the curved bars H I, and its outer end is bent down upon the side of the curved bar G, so that it may be kept in place as it moves back and forth by the said bent end and the said bracket W. To the bar X, between the curved bars H I, are attached the lower ends of two short uprights, Y, to the upper ends of which is attached a plate, Z.

In the uprights Y is formed a hole to receive the tube $A^1$, upon the outer end of which is formed a jaw, $B^1$, corresponding with a jaw, $C^1$, formed upon the outer end of a rod, $D^1$, inserted in the outer end of the tube $A^1$, and the movement of which within said tube is limited by the pins $E^1$ $F^1$, secured to said rod $D^1$ and passing through slots in the said tube $A^1$. The rod $D^1$ is held in, holding the jaws $B^1$ $C^1$ together, by a spring, $G^1$, one end of which rests against the pin $F^1$, and its other end rests against a collar, $H'$, attached to the tube $A^1$.

The rod $D^1$ is pushed out at the proper time by a cam, $I'$, attached to the outer side of the upright Y, and against which the pin $E^1$ strikes.

The tube $A^1$ is held out by a spring, $J'$, placed upon the said tube, with one end resting against the inner upright Y, and its other end resting against a pin, $K'$, passing through the said tube $A^1$. To the tube $A^1$, at the other side of the inner upright Y, is attached a pin, $L'$, which enters a notch in a collar, $M'$, attached to the said upright Y.

To the tube $A^1$ is attached a small gear-wheel, $N'$, the teeth of which, when the bar X is carried forward, come in contact with and mesh into the teeth of the rack $O'$ attached to the curved bar H.

The tube $A^1$ is moved inward at the proper time by the pin $P'$ attached to its end, and which strikes against the inclined guide-block $Q'$ pivoted to the curved bar H, and which is held in position by the spring $R'$.

The rear edge of the plate Z is notched for the needle N to pass through, and the size of said notch is regulated by a guide-plate, $S'$, secured adjustably by a set-screw, and the end of which projects down through said notch.

The rear edge of the bar X is notched for the needle N to pass through, and to the lower side of said bar, upon the opposite sides of the said notch, are pivoted two gear-wheels, $T'$, the teeth of which mesh into each other directly beneath said notch. To the pivot of the outer gear-wheel $T'$ is pivoted a three-armed lever, $U'$, the outer arm of which projects, so as to strike against and be operated by a catch, $V'$, attached to the upper bar B.

The rear arm of the lever $U'$ has a hook formed upon it, to take hold of the cord and carry it into such a position that it will be grasped and held by and between the teeth of the gear-wheels $T'$.

To the forward arm of the lever $U'$ is pivoted the end of a bar, $W'$, which passes through a hole in a guide-plate, $X'$, attached to the bar X, and is held forward by a spring, $Y'$.

To the bar $W'$ is pivoted a pawl, $Z'$, which is held forward by a spring, $A^2$, attached to the said bar $W'$, so as to engage with the teeth of the outer gear-wheel $T'$ and turn the gear-wheel $T'$ to grasp the cord when the lever $U'$ is operated by the catch $V'$.

$B^2$ is a knife attached to the forward part of the bar I, to cut the cord after the knot has been tied, and thus separate the bundle from the needle N.

The knife $B^2$ is held forward by a spring, $C^2$, and is pushed back, when the bar X and its attachments are making their return movement, by a plate, $D^2$, attached to the end of the said bar X.

When the bar X reaches the end of its forward movement the jaws $B^1$ $C^1$ are thrown open to relieve the bound gavel by pin $F^1$ striking a plate, $E^2$, pivoted to the bar F and held forward by a spring, $F^2$.

To the curved bar I, a little in front of the knife $B^2$, is attached a rubber block, $G^2$, to brush the cord off the end of the tube $A^1$ in forming the knot.

The curved frame is designed to be covered with a platform to receive the grain, and which is not shown in the drawings.

In using the device the end of the cord is secured in the gear-wheels T, and when the gavel is in place upon the platform the needle N descends. The jaws $B^1$ $C^1$ catch upon the two plies of the cord, and are then drawn inward, and the tube $A^1$ is turned, winding the cord around its end. At the same time the cord is grasped by the wheels $T'$, and held until the jaws $B^1$ $C^1$ come around and grasp it. The cord is now cut by the knife $B^2$, and the cord is brushed off the end of the tube $A^1$, so as to draw the loop over the ends of the jaws $B^1$ $C^1$, forming the knot.

Having thus described my invention, I claim as new and desire to secure by Letters Patent—

1. The combination of the tube $A^1$ and the rod $D^1$, provided with the jaws $B^1$ $C^1$, the pins $E^1$ $F^1$ $K'$ $L'$ $P'$, and the springs $G^1$ $J'$, with the bar X, the swinging bar K, and the curved frame G H I, substantially as herein shown and described.

2. The combination of the gear-wheel $N'$, the toothed rack $O'$, and the spring-guide $Q'$ $R'$ with the tube $A^1$ and rod $D^1$ and their attachments, substantially as herein shown and described.

3. The combination of the spring-knife $B^2$ $C^2$ and the rubber block $G^2$ with the curved bar I of the frame-work, and with the tube and rod $A^1$ $D^1$ and their attachments, substantially as herein shown and described.

4. The combination of the sliding bracket Z, the arm M, and the needle N with the swinging bar K and the tube and rod $A^1$ $D^1$ and their attachments, substantially as herein shown and described.

FRANK EUGENE McNALL.

Witnesses:
WARREN CASWELL,
STEPHEN R. McNALL.